(No Model.)
M. S. WELLER.
PLUMB LEVEL.
No. 340,841. Patented Apr. 27, 1886.
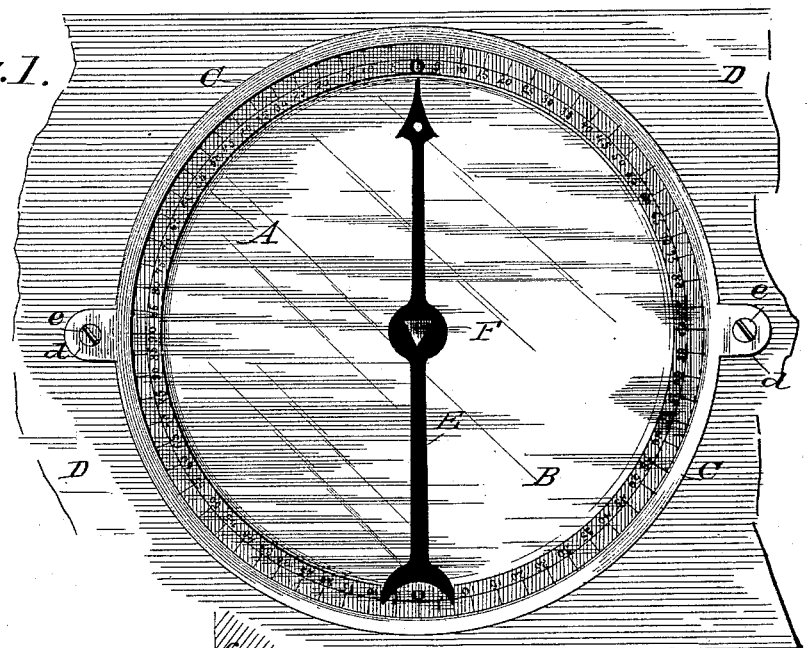
Fig. 1.
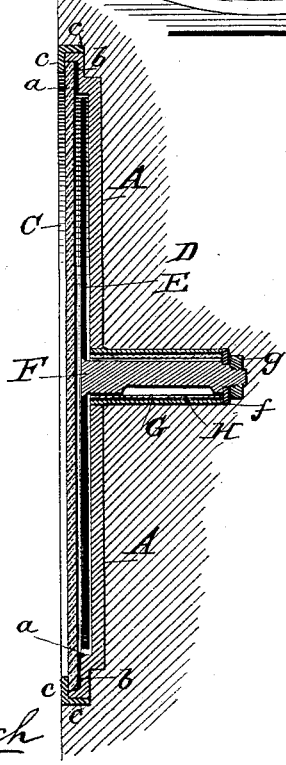
Fig. 2.
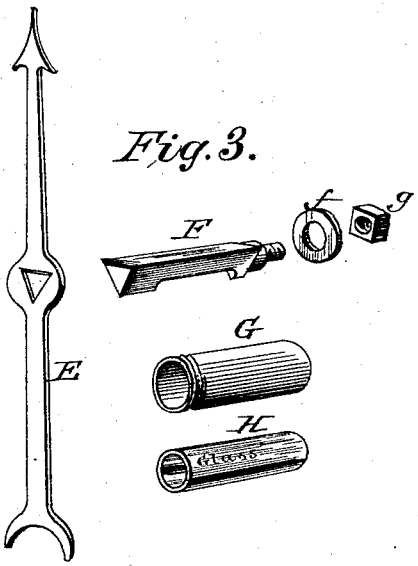
Fig. 3.
WITNESSES:
Fred G. Dieterich
Amos W. Hart
INVENTOR:
M. S. Weller
BY Munn & Co
ATTORNEYS.